US007721216B2

(12) United States Patent
Zaner et al.

(10) Patent No.: US 7,721,216 B2
(45) Date of Patent: May 18, 2010

(54) VISUAL GROUP INTERFACE FOR GROUP CONNECTIVITY

(75) Inventors: Melora Zaner, Seattle, WA (US);
Eugene Mesgar, Seattle, WA (US); Neel Ishwar Murarka, Seattle, WA (US);
Asta Glatzer, Redmond, WA (US);
Kathleen Mulcahy, Seattle, WA (US);
Rama Ranganath, Seattle, WA (US);
Erica Sanders, Seattle, WA (US);
Cesare John Saretto, Seattle, WA (US);
Tammy Savage, Seattle, WA (US); John Vert, Seattle, WA (US); Eugene Zarakhovsky, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 2465 days.

(21) Appl. No.: 10/174,422

(22) Filed: Jun. 18, 2002

(65) Prior Publication Data
US 2003/0233650 A1 Dec. 18, 2003

(51) Int. Cl.
*G06F 3/00* (2006.01)
*G06F 3/048* (2006.01)
(52) U.S. Cl. ............ 715/758; 715/733; 715/748; 715/751; 715/759; 715/764
(58) Field of Classification Search ............ 715/758
See application file for complete search history.

(56) References Cited

U.S. PATENT DOCUMENTS
5,223,828 A * 6/1993 McKiel, Jr. ............ 340/825.19
(Continued)

FOREIGN PATENT DOCUMENTS
CA 2324173 A1 4/2001
(Continued)

OTHER PUBLICATIONS
Microsoft Office's Storage Alternative, Jun. 2001, http://www.smartcomputing.com/editorial/article.asp?article=articles%2F2001%2Fs1206%2F36s06%2F36s06.asp.*
(Continued)

*Primary Examiner*—Kieu Vu
*Assistant Examiner*—Yongjia Pan
(74) *Attorney, Agent, or Firm*—Shook, Hardy & Bacon LLP

(57) ABSTRACT

A communication icon represents a shared connection allowing members of an online group to interact with each other and participate in different activities together. The icon through which the group interacts resides on each group member's desktop and has many attributes including click activation modes and drag and drop functionality. The icon provides each group member with a representation of the group's shared relationship. Any group member can change the group icon and have that change propagated to the computers of the other members of the group. The icon can be activated for both non-verbal and verbal communications as well as activity sharing. Online members of the group are kept apprised of the group's status and activities via a displayed status bar.

24 Claims, 14 Drawing Sheets

U.S. PATENT DOCUMENTS

| | | | |
|---|---|---|---|
| 5,793,365 A * | 8/1998 | Tang et al. | 715/758 |
| 5,872,925 A | 2/1999 | Han | |
| 6,100,888 A * | 8/2000 | Gourdol et al. | 715/837 |
| 6,237,025 B1 * | 5/2001 | Ludwig et al. | 709/204 |
| 6,289,372 B1 | 9/2001 | Vyaznikov | |
| 6,484,196 B1 | 11/2002 | Maurille | |
| 6,670,970 B1 * | 12/2003 | Bonura et al. | 715/768 |
| 6,791,583 B2 | 9/2004 | Tang et al. | |
| 7,124,164 B1 | 10/2006 | Chemtob | |
| 7,281,215 B1 * | 10/2007 | Canfield et al. | 715/752 |
| 7,421,660 B2 | 9/2008 | Chamock et al. | |
| 2002/0075305 A1 * | 6/2002 | Beaton et al. | 345/751 |
| 2002/0097267 A1 | 7/2002 | Dinan et al. | |
| 2002/0143876 A1 | 10/2002 | Boyer et al. | |
| 2002/0143989 A1 | 10/2002 | Huitema et al. | |
| 2003/0028610 A1 * | 2/2003 | Pearson | 709/213 |
| 2003/0055892 A1 | 3/2003 | Huitema et al. | |
| 2003/0065721 A1 * | 4/2003 | Roskind | 709/204 |
| 2004/0041836 A1 | 3/2004 | Zaner et al. | |
| 2004/0205091 A1 | 10/2004 | Mulcahy et al. | |
| 2004/0221309 A1 | 11/2004 | Zaner et al. | |
| 2004/0243672 A1 | 12/2004 | Markki et al. | |
| 2006/0184886 A1 | 8/2006 | Chung et al. | |

FOREIGN PATENT DOCUMENTS

| | | |
|---|---|---|
| WO | WO 00/52887 A1 | 9/2000 |
| WO | WO01/33327 A1 | 5/2001 |
| WO | WO01/38994 A1 | 5/2001 |
| WO | WO0146942 | 6/2001 |
| WO | WO 01/33327 A1 * | 10/2001 |

OTHER PUBLICATIONS

John C. Tang; Nicole Yankelovich; James "Bo" Begole; Max Van Kleek; Francis Li; Janak Bhalodia, ConNexus to Awarenex Extending awareness to mobile users, 2001, ACM, pp. 221-228.*

Bouvin, "Designing User Interfaces for Collaborative Web-Based Open Hypermedia," *in Proceedings of the Eleventh ACM Conference on Hypertext and Hypermedia*, pp. 230-231 (San Antonio, TX, 2000).

Cugola et al., "Peer-to-Peer for Collaborative Applications," *in Proceedings of the 22nd International Conference on Distributed Computing Systems Workshops (ICDCS'02)*, pp. 359-364 (Vienna, Austria, Jul. 2-5, 2002).

Dorohonceanu et al., "A Desktop Design for Synchronous Collaboration," *in Proceedings of the Graphics Interface '99 (GI'99)*, pp. 27-35 (Kingston, Ontario, Canada, Jun. 1999).

Duhr, "Oberflächenelemente in interaktiven und kooperativen anwendungen," Universität Oldenburg, Department of Information Systems Thesis (Aug. 2000).

García et al., "Extending a Collaborative Architecture to Support Emotional Awareness," *EBAA '99—Workshop on Emotion-Based Agent Architectures*, pp. 46-52 (May 2, 1999).

Greenberg et al., "Using a Room Metaphor to Ease Transitions in Groupware," University of Calgary, Department of Computer Science, *Research Report 98/611/02*, 31 pages (1998).

Gutwin, "Workspace Awareness in Real-Time Distributed Groupware," The University of Calgary, Department of Computer Science, Ph.D. Thesis, 270 pages (Dec. 1997).

Kindberg, "Mushroom: A Framework for Collaboration and Interaction Across the Internet," *in Proceedings of the Fifth ERCIM Workshop on CSCW and the Web* (St. Augustin, Germany, Feb. 1996).

Schmidt et al., "A Generic System for Web-Based Group Interaction," *in Proceedings of the Thirty-First Hawaii International Conference on System Sciences*, vol. I, pp. 545-554 (Kohala Coast, HI, Jan. 6-9, 1998).

Boyer; "Virtual Social Clubs: Meeting Places for the Internet Community," *Multimedia Computing and Systems, IEEE International Conference in Florence Italy*, 297-301 (Jun. 1999).

Lee et al., "Supporting Multi-User, Multi-Applet Workspaces in CBE," *Proceedings of the ACM 1996 Conference on Computer Supported Cooperative Work, Boston Massachusettes*, 344-353 (Nov. 1996).

Greenberg, "Collaborative Interfaces for the Web," *Human Factors and Web Development*, 241-253 (1997).

Smith, Marc A., et al., "The Social Life of Small Graphical Chat Spaces," *In Proceedings of CHI 2000*, The Hague, Netherlands, http://research.microsoft.com/scg/papers/vchatchi2000.pdf (Mar. 2000) pp. 1-8.

Cheng, Lili, et al., "Hutchworld: Lessons Learned. A Collaborative Project: Fred Hutchsinson Cancer Research Center & Microsoft Research," *In Proceedings of Virtual Worlds Conference 2000*, Paris, France, http://research.microsoft.com/scg/papers/hutchvw2000.pdf, (Jun. 2000) pp. 1-12.

Kollock, Peter, "The Economies of Online Cooperation: Gifts and Public Goods in Cyberspace," *Communities in Cyberspace*, 1998 http://www.sscnet.ucla.edu/soc/faculty/kollock/papers/economies.htm, pp. 1-17.

Kollock, Peter, et al., "Managing The Virtual Commons: Cooperation and Conflict in Computer Communities," *University of California, Los Angeles*, http://research.microsoft.com/scg/papers/KollockCommons.htm (1996) pp. 1-20.

Smith, Marc, et al., "What Do People Do in Virtual Worlds? An Analysis of V-Chat Log File Data," *University of California, Los Angeles*, http://research.microsoft.com/scg/papers/kollockv-chat.pdf (1998) pp. 1-30.

Farnham, Shelly, et al., "Supporting Sociability In A Shared Browser," *In Proceedings of Interact Conference*, Tokyo, Japan, http://research.microsoft.com/scg/papers/sharedbrowsinginteract.pdf (Jul. 2001) pp. 1-8.

Alternative_Interfaces_for_Chat_-_ACM, 1999 Vroney, et al.

Conversation_Trees_and_Theaded_Chat_Spaces_-_Technical_Report_MSR-TR-2000-43, Jun. 20, 2000, Smith, et al.

Connexus to Awarenex, Extending Awareness to Mobile Users, John c. Tang, Nicole Yankelovich, James "Bo" Begole, Max Van Kleek, Francis Li, and Janak Bhalodia, Sun Microsystems Laboratories, 8 pages, 04-05 to 03-31 CHI 2001, tang@eng.sun.com, nicoley@east.sun.com, begole@eng.sun.com.

* cited by examiner

Send Greeting to Group

Group Server

Fig. 9     Sharing a File with the Group

VISUAL GROUP INTERFACE FOR GROUP CONNECTIVITY

TECHNICAL FIELD

This invention relates generally to group messaging and, more particularly, relates to a desktop connection to a group that facilitates group communication and activities.

BACKGROUND OF THE INVENTION

As computer technology and the Internet have taken on increasingly important roles in people's lives, Internet users are beginning to demand not only enhanced productivity, but also enhanced recreational activities and a greater sense of community. A variety of programs and services have been created to meet these demands, including Internet chatting and instant messaging, streaming audio, file sharing capabilities and multi-player network games. Unfortunately, while these applications allow users to communicate in a variety of ways with friends and peers, they fail to provide users with a sense of community and a shared relationship.

A number of instant messaging programs are now commercially available, and their popularity is indicative of consumers' need to instantly communicate with friends and acquaintances. Different applications provide different levels of functionality, but most of these programs allow a user to: send and receive text messages to/from a remote user, send and receive files to/from a remote user, and initiate group chatting sessions to which the user can then add participants. Through these programs, a user can discover whether or not a friend is available for communication, and, if so, trade text messages back and forth. These programs thereby give the user a sense of constant connectivity, but through a medium requiring far less attention than a phone for example. While these applications are in many ways successful mediums for communication, they fail to provide participants with a sense of community or context within which their relationship can evolve. While many chatting programs allow contacts to be grouped into "buddy lists," this set of contacts does not necessarily know of each other's existence nor do they necessarily share activities with each other. In other words, the only sense of community is imposed by one user onto his or her contacts without permission, or the other participants' knowledge. Furthermore, this grouping of contacts is a mere listing and does not facilitate group activities or interaction, further impeding the development of a sense of community.

Other currently available recreationally oriented applications include file-sharing programs. These programs enable users to download and upload (and thereby share) files with members of the public (normally whoever is running the same program at that time). When the program is running, these users may often also have the opportunity to chat with other users of the service, but an intimate persistent relationship between a particular user and a small select group of users is lacking. Unlike physical relationships, the "community" in this setting is quite large (normally encompassing thousands of users) and non-selective. A user cannot easily choose with whom to interact. Moreover, a user's relationship with other users is necessarily limited to file sharing and chatting in a public room, thereby limiting other forms of interaction that might be desirable.

Finally, multi-player games that allow users at home to play with and against remote users are becoming ever more popular. From traditional games of chess involving two opponents and a number of observers to "first-person shooters" involving dozens of opponents, there are many possible venues of interaction, and many modern games give users the ability to chat concurrently. Participation in these games, and the knowledge that other players share at least this interest with the user, may give users a slightly greater sense of community than was previously available. Many games provide the capability of forming private arenas in which a group can play and chat together. However, the users' sense of community is stunted by the extent to which their interactions with each other are limited. In particular, users may form a group to game with at one site, but continually have to set up the group each time they want to play. The group is thus not persistent, nor is it mobile. That is, the group cannot be taken intact to other activities like another game or even an online journal. Each time, the user has to form the group.

While users of gaming environments are able to play games with each other and chat at the same time, they typically cannot interact in other ways. They are also typically unaware of the other users' presence unless they interact through another chatting program. In addition, in order to interact at all, the players must be involved in an attention-grabbing game, making less intrusive activity sharing impossible. Thus, while multi-player games are successful at creating a gaming community, they are unsuccessful at creating the relaxed, social community that many consumers might hope to form.

There is a need for a group communication application through which an intimate group of users can interact with each other in any number of ways, and through which users can depend on a constant connection to a small select group of friends who will share these activities with each other. Such a system would give the Internet generation a sense of constant social connection and a shared relationship with their friends similar in many ways to those developed in the physical world.

SUMMARY OF THE INVENTION

The present invention is directed to a group experience facilitated by one or more icons, such as on a computer desktop, computer display bar or other display space for holding one or more icons, gaming system display, cell phone display, PDA display, or any other display on any device capable of communication over a network, as well as the underlying functionality associated with the icon or icons that represents a shared connection for a small group of users through which the online members of the group can interact with each other and jointly participate in different activities.

The group that communicates through this shared connection is formed through a process that mimics non-Internet based social interaction. Any member of a group can invite his or her friends and acquaintances to join the group, and those users are free to join as they please. However, only those users invited into the group can join, and there is no public, unrestricted access. Groups are not published or publicized, and are hence made known to a particular potential participant via a communication, formal or informal, online or offline, originating from a current group member. If a particular member of the group dislikes some other member, he or she cannot "kick" that other member out of the group. However, as in most social settings, any member is free to leave the group. This communal balancing act has been proven in research to drive socialization and a sense of presence, and to foster a feeling of community and shared experience among group members. Moreover, these persistent groups mimic more traditional social interactions where groups of friends participate in a variety of activities with each other, and are designed to provide an alternative to more individualized, one-on-one communications.

The core application through which the group interacts resides on each group member's desktop (or other device display area) and has many of the attributes of normal desktop icons. Since it appears as an icon, the application provides a highly visible, immediate, and uncomplicated avenue for communication, and also provides the group with a graphical representation of their shared relationship. In one implementation, any group member can change the particular icon displayed on his or her display and that change will be propagated to the other members of the group.

Using this desktop icon, each member of the group is able to communicate and interact with the group as a whole. In particular, the application provides for non-verbal and verbal communications as well as activity sharing. Supported functionality includes the ability of any member of the group to double-click on the icon, in order to send a unique verbal or non-verbal greeting to each member of the group. This action sends a sound, image and/or animation to each member of the group. Members of the group can also participate in more traditional activities, such as chatting and instant messaging, as well as file sharing and game playing. Significantly, the same group is persistent through this range of activities, allowing the group to further develop the desired sense of community through a shared set of experiences.

Online members of the group are also kept apprised of the group's activities and communications. For example, "greetings" can be sent to and displayed on the screen of every member of the group, regardless of what applications are running in the foreground. Other application messages or functions, like chat invitations or file send activities, are more fundamentally intrusive, calling for the group member's attention. Finally, regardless of whether a group member was initially invited to join in an activity (if, for example, that member was off-line when the activity began), group status and activity notifications are displayed along with the desktop icon, and, by interacting with the application, the user can join whatever group activity is in progress. This constant and intrusive connection with the group transforms the typical chatting experience into a richer, fuller social interaction.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1A:
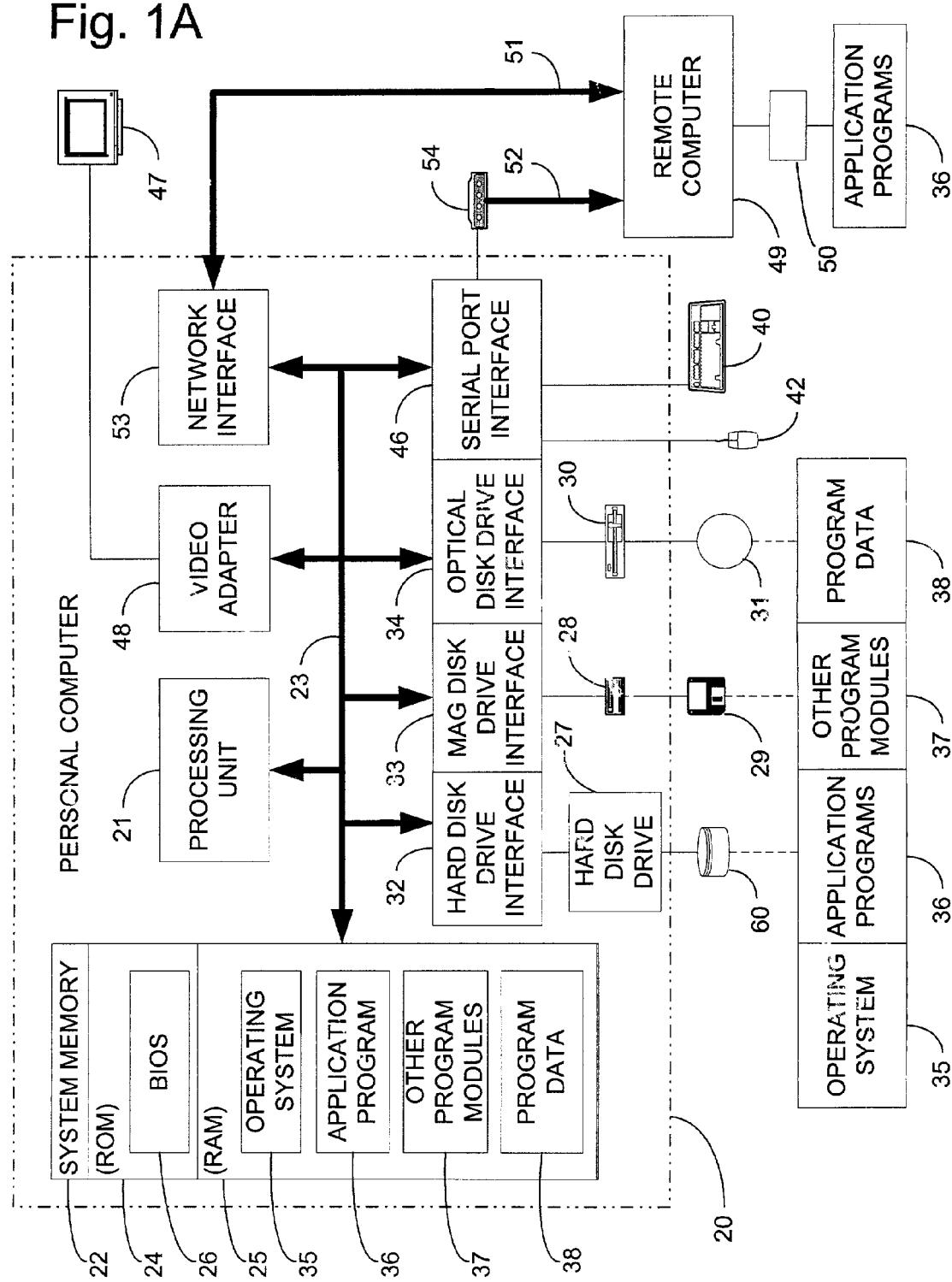
FIG. 1A is a block diagram generally illustrating an exemplary computer system usable to implement an embodiment of the invention.

Turning to the drawings, wherein like reference numerals refer to like elements, the invention is described hereinafter in the context of a computing environment. Although it is not required for practicing the invention, the invention is described as it is implemented by computer-executable instructions, such as program modules, that are executed by a Personal Computer (PC). Generally, program modules include routines, programs, objects, components, data structures and the like that perform particular tasks or implement particular abstract data types.

The invention may be implemented in computer system configurations other than a PC. For example, the invention may be realized in hand-held devices, mobile phones, multi-processor systems, microprocessor-based or programmable consumer electronics, network PCs, minicomputers, mainframe computers and the like, including any device capable of both visual display and network communication. The invention may also be practiced in distributed computing environments, where tasks are performed by remote processing devices that are linked through a communications network. In a distributed computing environment, program modules may be located in both local and remote memory storage devices.

Thus, although the following detailed description of the invention is set forth in the context of an exemplary general-purpose computing device in the form of a conventional PC 20, it will be understood that the invention is preferably incorporated into many types of computing environments as suggested above.

Before describing the invention in detail, the computing environment in which the invention operates is described in connection with FIG. 1A. The PC 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the PC 20, such as during start-up, is stored in ROM 24. The PC 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the PC 20. Although the exemplary environment described herein employs a hard disk 60, a removable magnetic disk 29, and a removable optical disk 31, it will be appreciated by those skilled in the art that other types of computer readable media which can store data that is accessible by a computing device, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the PC 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, PCs typically include other peripheral output devices, not shown, such as speakers and printers.

The PC 20 operates in a networked environment using fixed or transient logical connections to one or more remote computers, such as a remote computer 49. The remote computer 49 may be another PC, a server, a router, a network PC, a peer device or other common network node, or any other device type such as any of those mentioned elsewhere herein, and typically includes many or all of the elements described above relative to the PC 20, although there is no such requirement, and only a memory storage device 50 has been illustrated in FIG. 1A. The logical connections depicted in FIG. 1A include a local area network (LAN) 51 and a wide area network (WAN) 52. Such networking environments are commonplace in offices, enterprise-wide computer networks, intranets and the Internet.

When used in a LAN networking environment, the PC 20 is connected to the local network 51 through a network interface or adapter 53. When used in a WAN networking environment, the PC 20 typically includes a modem 54 or other means for establishing communications over the WAN 52. The modem 54, which may be internal or external, is connected to the system bus 23 via the serial port interface 46. Program modules depicted relative to the PC 20, or portions thereof, may be stored in the remote memory storage device. It will be appreciated that the network connections shown are exemplary and other means of establishing a communications link between the computers may be used. Additionally, the invention is not intended to be limited to a particular network type. Any network type, wired or wireless, fixed or transient, circuit-switched, packet-switched or other network architectures, may be used to implement the present invention.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

The invention allows a constant connectivity between members of a small and intimate group, recreating in the virtual world many of the relationship types that users foster in their physical world existence. The members of a group supported by the invention are capable of friendly or unfriendly interaction, intense or casual interaction, falling out, falling in love, or any other way of being with each other that is possible through close communication in a small group.

In accordance with one aspect of the invention, an application program is represented by a desktop icon through which a group member can communicate and interact with other online members of the group. This group is persistent through the range of activities offered by the application program, and the members of the group are kept abreast of group activities through notifications and activity indicators. It will be appreciated that the use of the term "desktop" and "desktop icon" are not intended to limit the invention to a traditional desktop display. The term "desktop" as used herein includes its traditional meaning in the computer arts, but does not exclude other types of visual display spaces on devices ranging from watches to desktop computers.

In one embodiment of the invention, the group members communicate through a peer-to-peer connection. This peer-to-peer technology, which is well known in the art, focuses on the group members' individual computers, and organizes communication within the group without the need for a central server. In general, when a message, file or other communication is propagated through the group, each group member is in communication with at least one other member of the group (but not necessarily every member of the group). The group member from which the communication is originating informs those members of the group with which it is connected that a communication is ready to be transmitted, and then those members of the group inform the other members of the group with which they are connected and so on, until every member of the group has received the communication.

Figure 1B:
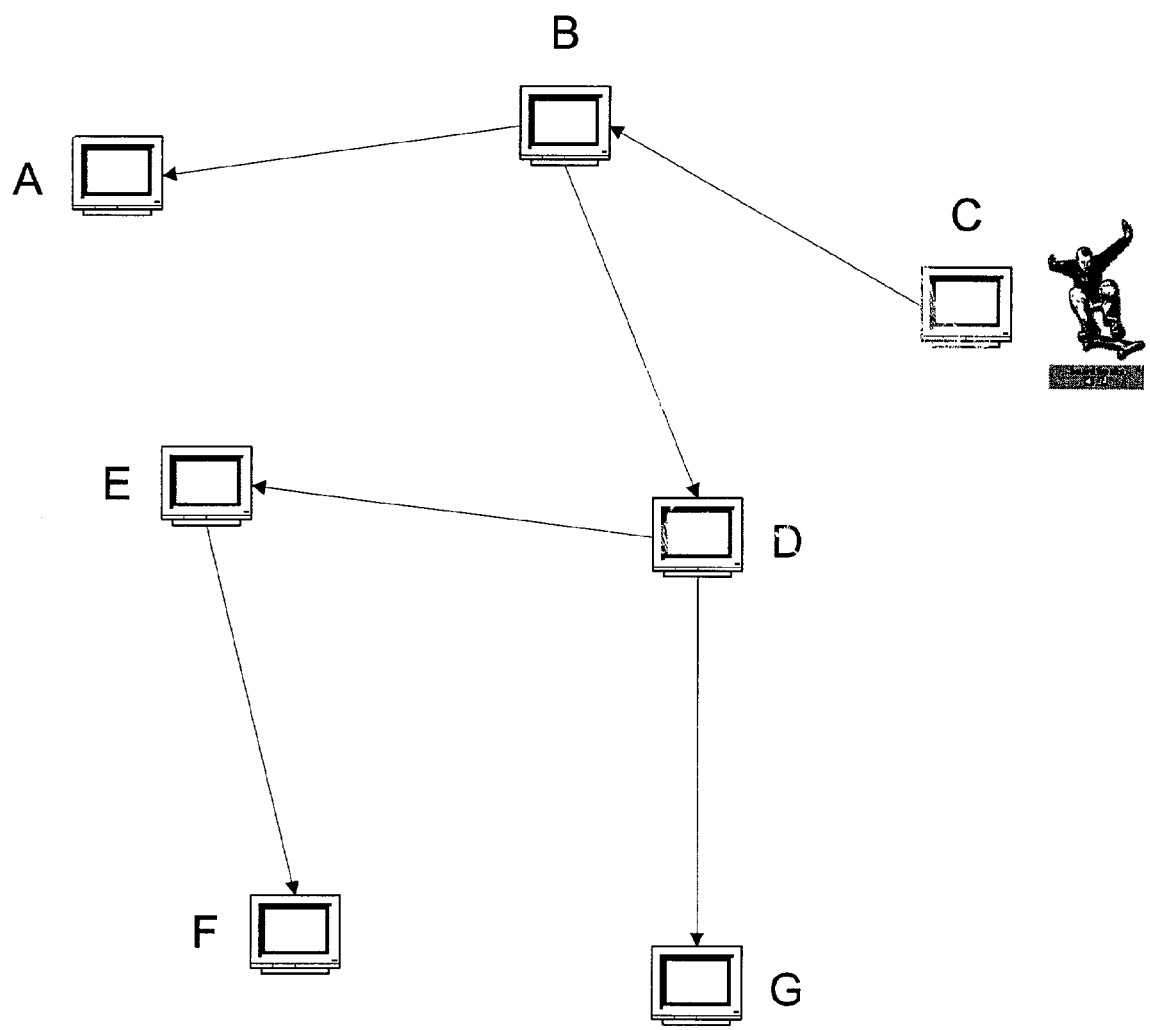
FIG. 1B is a block diagram illustrating an exemplary peer-to-peer network for facilitating communications in an embodiment of the invention.

For example, in FIG. 1B, the group member C has a skateboarder icon that he or she wishes to share with the rest of his or her group, comprised of computers A through G. The lines in the Figure represent the logical connections between the various computers, so that A is connected to B, B is connected to A, C and D, C is connected to B, D is connected to B, E and G, E is connected to D and F, F is connected to E, and G is connected to D. The arrows represent the route by which the skateboarder icon will be sent through this peer-to-peer network to arrive at each computer in the group. The originating group member C first informs B that an icon is ready to be transferred, and transfers the icon to B when B requests it. B then notifies A and D that an icon is ready to be transferred, and then transfers the icon to A and D, and so on through the peer-to-peer network. In this way, the icon is rapidly transferred to each computer on the network without the need for a central server to store the icon and then allow access to the icon from every computer.

To increase the peer-to-peer group's efficiency, each computer in the group also stores "common files" in a database that is kept current with the other members' databases in the group. This database can be kept current in many different ways. In one implementation, whenever a particular computer changes the database, it can propagate these changes to the other computers in the peer-to-peer network using the transfer procedures described above. Alternatively, the computers in the group might automatically update their databases after a certain time period passes, checking the computers in logical connection with them for newer versions of the database. While peer-to-peer technologies have a number of advantages, including independence from a central server and often better resource utilization, the present invention can also be implemented using a central server system, a hybrid system, or other networking technology.

To form the contemplated groups, members are added by invitation from a current member, and can only remove themselves. That is, current members cannot be ejected from the group. This particular community structure encourages the growth of a trusted relationship between the members of a small and intimate group and prevents unchecked group expansion or the infiltration of unknown, and perhaps unwelcome members. In an Internet-based environment especially, a more public group might grow too large and unwieldy for the more intimate communications contemplated by this invention. To add a new member to a group, a group member, in one implementation, searches a public directory (such as Microsoft's MSN Messenger's directory, or other directory) to find the contact and computer information necessary for an invitation. An invitation is subsequently sent to that prospective member using an existing protocol or program, such as Microsoft's MSN Messenger. If the invitation is accepted, the new member of the group, if the new member does not already have the program, manually or automatically downloads the program application implementing the functionality of this invention, such as from a public server, and proceeds to connect to the group using peer-to-peer technologies.

Other implementations may provide differently for adding group members. So, for example, the group application might be included with an operating system, and upon registration of the operating system the user is also registered in a database of available prospective members. In yet another implementation, the inviting member of the group sends a password to a prospective member using existing protocols, and that password can be used along with the program application to connect with the group.

Figure 2:
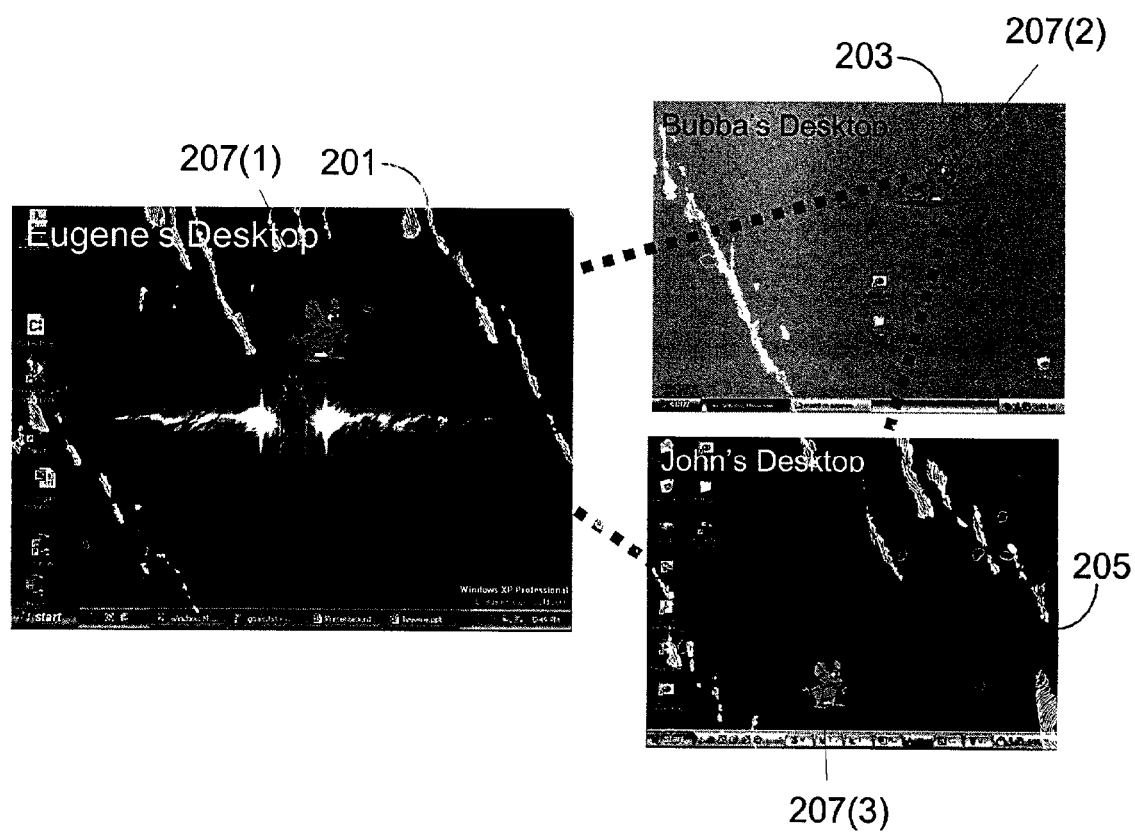
FIG. 2 is a collection of screen shots illustrating desktops of group members according to an embodiment of the invention.

Once a group has been formed, each online member of the group can see the group icon representing their shared connection resident on his or her desktop or other display space, as shown in FIG. 2. In this example, Bubba, Eugene and John are members of a group represented by a mouse icon 207(1), (2), (3) described below, which is on each member's respective desktop, 201, 203, 205. This mouse icon 207(1), (2), (3) behaves in many respects like other, more familiar visually rendered icons or objects, to facilitate group interaction: it is draggable, it can accept drop targets and it is anchored to the desktop or display space. Taking up less room than most application programs, the application encourages group members to remain online in communication with the group regardless of their foreground activities. This unobtrusive setting also enables users to have multiple group icons on their desktops, representing different relationships that a user might have with different groups. In addition, a user may be online to some group or groups and offline to another group or groups as one form of social management.

Figure 3:
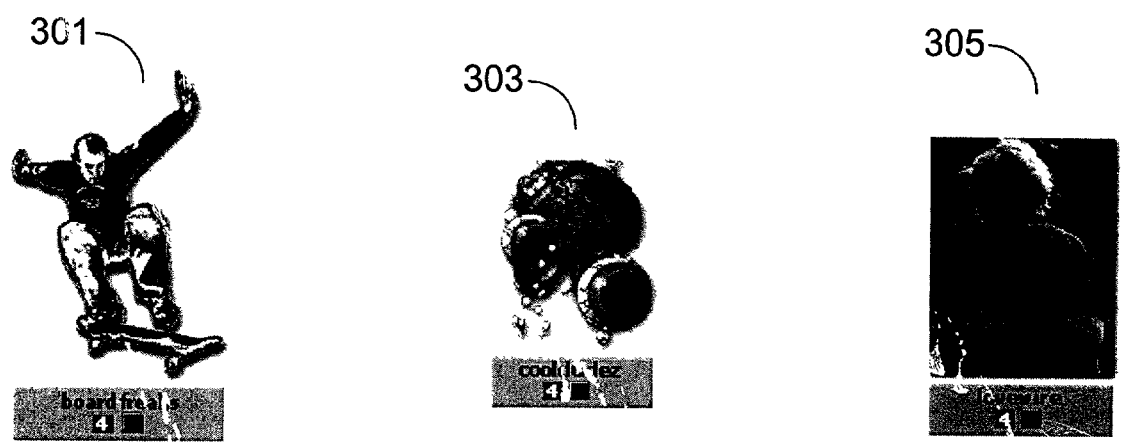
FIG. 3 is a series of screen shots illustrating different desktop icons for implementing an embodiment of the present invention.

Giving further context to the group's interactions, a group icon is not a static entity but can encapsulate any of a number of relationships, as shown in FIG. 3. Any member of the group can change the group icon, and have that change propagated to the other members' desktops. So, using the example in FIG. 2, if Bubba changes the mouse icon to the skateboarder icon 301 shown in FIG. 3, Eugene and John will have their group icon changed to a skateboarder icon 301 in one embodiment. In one implementation, the number of different icons is limited to those packaged with the invention or approved by a distributor. In this example, the skateboarder icon 301 would necessarily be included with the group application. When Bubba changes his icon to the skateboarder icon 301, a request is immediately sent to Eugene's and John's computers that their icons also be changed to the skateboarder icon 301, and that request is granted automatically if their computers are online, or granted later, when their computers come online. Alternatively, the application might allow user-defined icons with associated user-defined actions. Assuming that the skateboarder icon 301 did not, in fact, come packaged with the application, Bubba's computer now sends the files necessary to describe the skateboarder icon 301, in addition to a request for an icon change to Eugene's and John's computers. These icons provide a frame through which group members can understand their relationship and interactions. Using this visual, non-verbal communication, group members begin to build their relationship and sense of group culture based on shared characteristics and identity. FIG. 3 shows other examples of potential program icons 303, 305 that can communicate the differing roles of the various groups in which a member is participant.

Interacting with the group icon will be a familiar and easy process for most computing device users. In one implementation, double clicking performs a network action propagated to the other members of the group, and clicking the right mouse button brings up a menu, similar to that shown in FIG. 4 at menu 401. From this menu 401, the group member has the ability to interact with the other members of the group in a number of ways, such as changing the icon through the Change Wire option 413, sending a file through the Send File option 415, or sending other communications through the Launch option 411. The user also has access to other program functions through this menu, such as Help 417, Delete 419 and Close 421. In an embodiment of the invention, Delete 419 removes the user from the group and removes the group permanently from their desktop. In a further embodiment of the invention, Close 421 simply means to close out of the group—meaning the user is no longer online to that group but could be online to other groups as discussed above. When a user closes a group they appear offline to the group and do not receive greetings or notifications. By implementing this group functionality using accessible, familiar and compact interfaces, the application is more likely to remain open and available on group member's desktops and displays.

When the members of a group are online and running this application, they have the ability to interact, as a group, in a nearly unlimited number of ways. Although a number of activities are described below, these activities are simply representative and are not meant to be limiting of the scope of this invention. Using different program modules that can interact with the described application, any activity that can be implemented in code and shared by a group of differently located users can be implemented within the invention.

Figure 5:
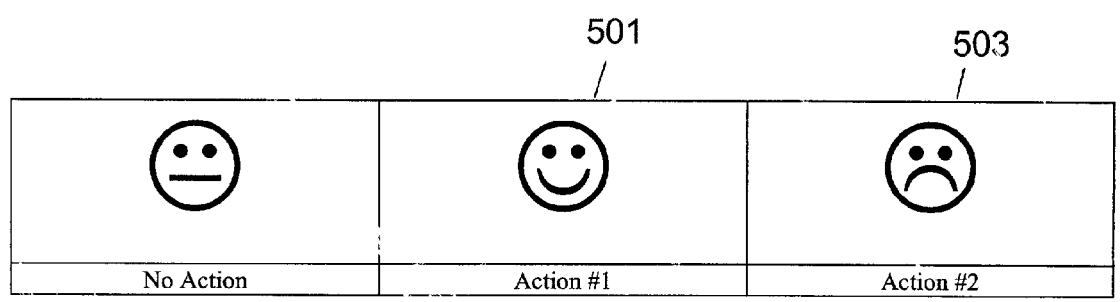
FIG. 5 is a table illustrating the different exemplary images displayed according to actions executed upon the desktop icon according to an embodiment of the invention.

In one embodiment, when one member of the group double-clicks on the group icon, a greeting is sent to every online member of the group. This greeting can include a verbal message, audio and a visual effect, and informs the other members of the group that someone has interacted with the group icon. Additionally, as shown in FIG. 5, different actions (e.g. click combinations, etc.) performed on the group icon might represent different emotional states that a group member wants to share with the group. By performing a first action on his or her group icon, the group member can express his or her happiness and interact with the group to provide further explanation (501). Similarly, the group member might perform a second action on the icon, expressing disappointment or anger at some event (503). Every online member will receive an indication pursuant to the action, creating a shared emotional experience. So, for example, performance of a first action on the skateboard icon 301 shown in FIG. 2 could make the skateboarder perform a trick on each member's desktop. Instead of indicating an emotional state, the user might just want to inform the other group members that someone in the group wants to interact in some activity with the group, or might simply want to let the other members know that he or she is thinking of the group. This simple and efficient communication creates a shared, unique dialogue between members of the group, akin to an inside joke or secret language.

The above communication is quite simple, and provides group members with a more unique and personal interaction, the application allows group members, within this embodiment, to send individually defined greetings to each other. When a particular group member wishes to let the group know that he or she is online or to inform the group of some event, the group member can design or select a greeting and send it to each member of the group, as described in FIG. 6A.

Figure 6A:
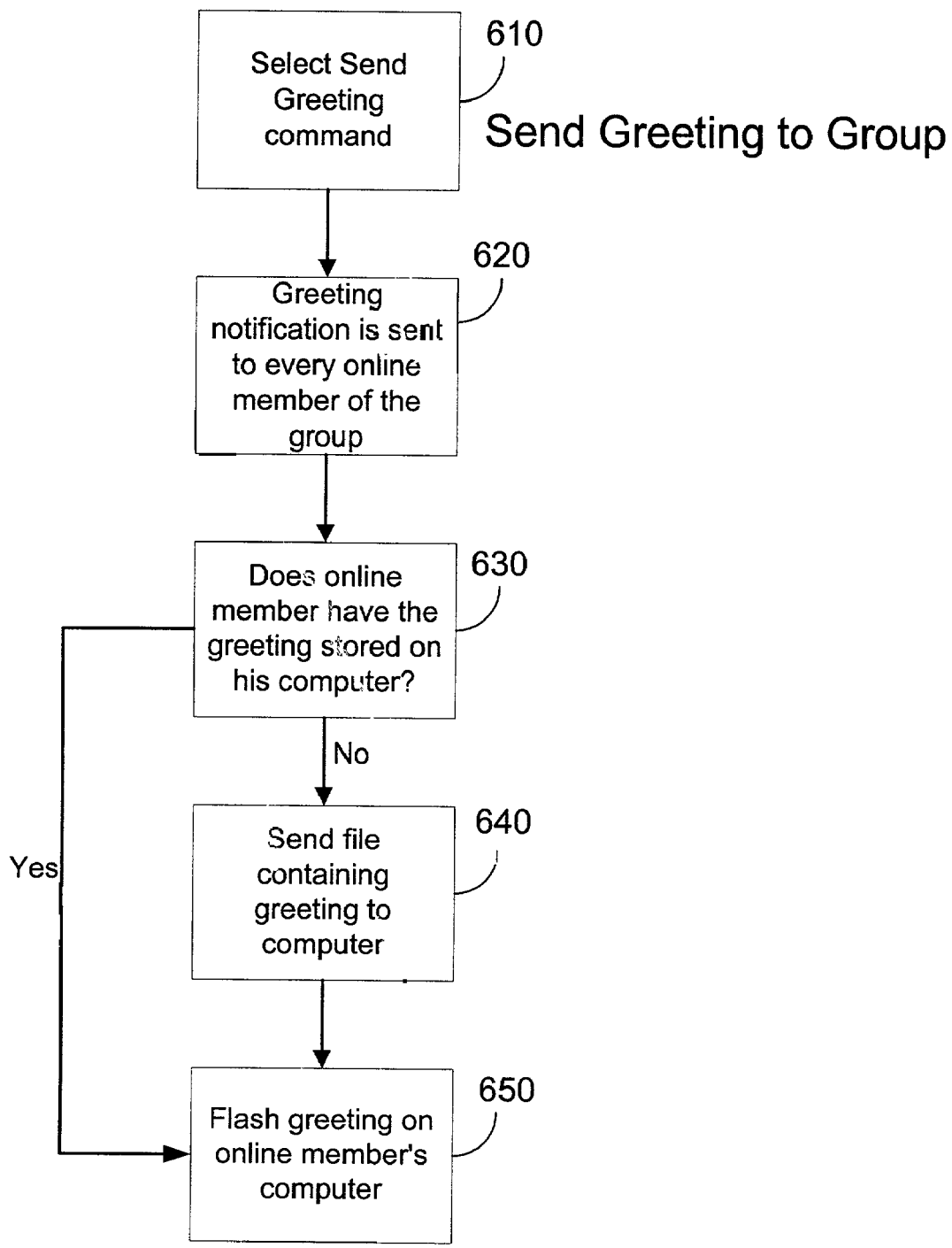
FIG. 6A is a flowchart illustrating a greeting communication according to an embodiment of the present invention.

The first step, not shown in FIG. 6A, is the design of a greeting. According to the format chosen for the greeting, a group member can use a number of different programs, including a drawing program to design an image, a text program to construct a message and an animation program to design a suitable animation. Alternatively, the invention provides in an embodiment an interactive greeting maker, whereby the functionalities of many of these programs are combined to further facilitate the member's task. The large number of variables that combine in a greeting allow a particular member to easily make a greeting that is essentially unique, and that will adequately identify that member for the group.

After creating an appropriate greeting, the group member can send a greeting notification to the group at a time that the group member chooses, according to step 610. In the peer-to-peer infrastructure described above, this greeting notification would be forwarded to each member of the group, stemming from the notification originating with the sending group member. In one implementation, the sending group member's computer has assigned an ID (preferably automatically), unique to the group's greetings, to the particular greeting of the sending group member, and that ID will be sent out along with the greeting notification, which is sent at step 620. When a different group member receives the notification along with the ID, that group member's computer will search its peer-to-peer database for the greeting associated with that ID, as shown at step 630. If the greeting is not, in fact, stored on that computer, the file or files describing the greeting (including a file or files having text, visual and/or audio data) must first be sent to that user before the greeting can be displayed, as shown at steps 640 and 650. It is worth noting that whenever a user changes his or her greeting, the ID should be updated to reflect that the file or files needed by the other group members have changed. In addition, once the necessary file or files have been downloaded a first time by a particular group member and stored in the peer-to-peer database, the only network traffic required to send that group member the greeting is the relatively small notification including the sending group member's ID. The file or files will then remain in the receiving user's shared database to increase the efficiency of this communications system.

Figure 6B:
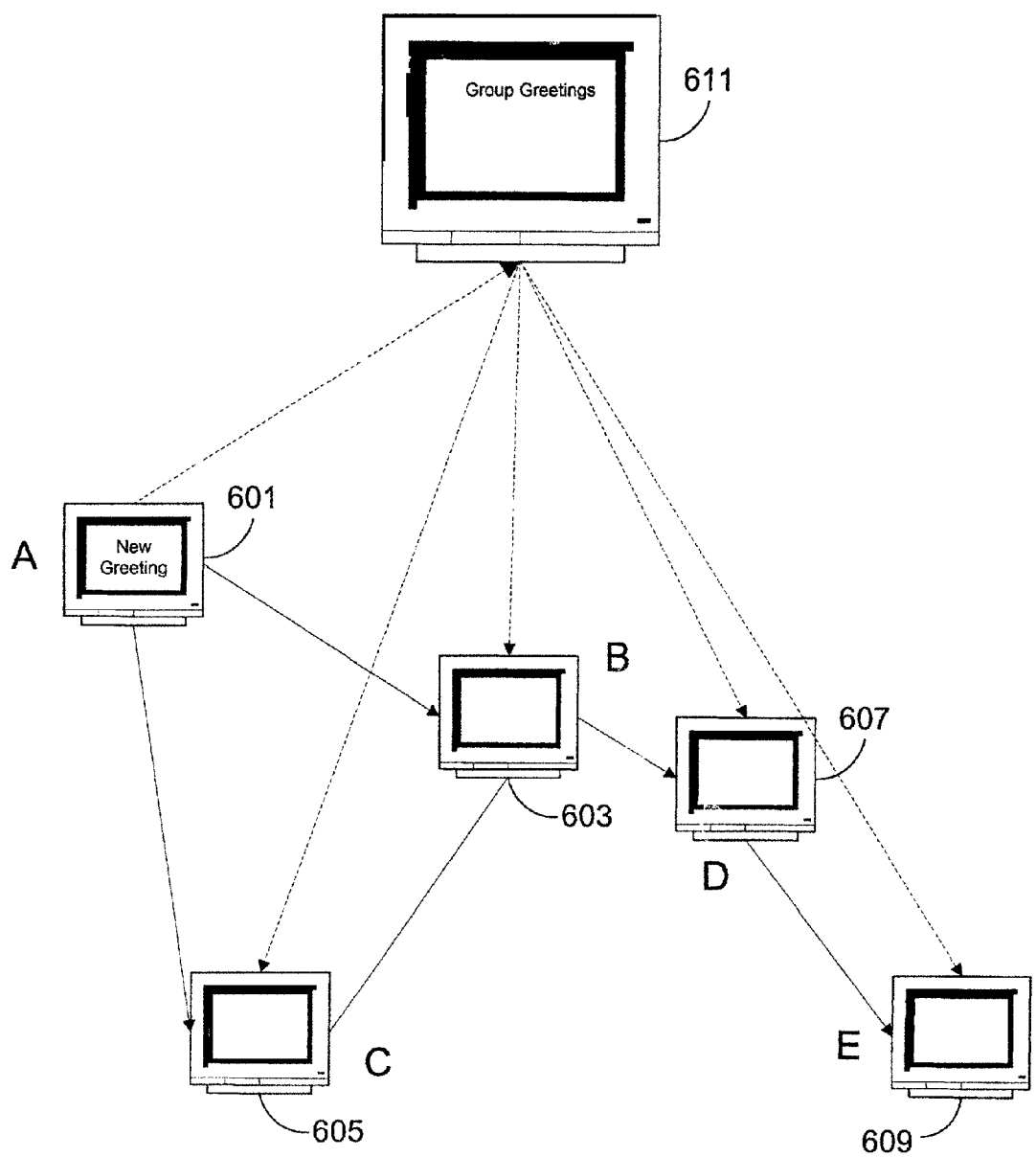
FIG. 6B is a block diagram illustrating both an exemplary peer-to-peer network and an exemplary central server network through which a greeting can be sent according to an embodiment of the present invention.

For an example of the above-described and alternative implementations, in FIG. 6B, the group member on computer A (601) has a new greeting that he or she wishes to send to the other members of the group. In the above-described peer-to-peer embodiment, represented by the solid lines, the other computers in the group, B (603) through E (609), each have a peer-to-peer database, in which are stored a number of greetings and associated IDs. When A (601) sends this new greeting, A (601) first sends to each computer the newly generated ID associated with the greeting. Since A (601) has just designed this new greeting, the other computers in the group will reply with requests for the files representing the new greeting. In one implementation, the computers B (603) through E (609) will begin sending periodic requests to the computers with which they are logically connected for the files associated with the particular greeting ID that was originally forwarded to them. Thus, B (603) and C (605) will request the files from A (601), and once those files are transferred, D's request of B (603) for the files will be fulfilled, and finally E's request of D (607) for the files will be fulfilled. In other implementations, A (601) could receive requests for the files associated with the greeting from each computer. Computer A (601) would then package the files, indicate all of the computers that have requested the files, and send the files to every computer with which A (601) is logically connected. The files would then get routed through the peer-to-peer network to arrive at the computers that originally requested them. This implementation is especially suited for use when most of the computers in the group have received the new greeting, but a few have not.

In other embodiments, member-defined greetings can be stored on a central server 611 and sent to each group member's computer each time there is a greeting notification, or cached on each group member's computer and updated from the central group server 611 when appropriate. In these implementations, represented in FIG. 6B with the dotted lines, a group server 611 acts as a repository for the group's greetings. When A (601) wishes to send a new greeting to the group, A (601) first sends the group server 611 the ID for the greeting. When the server 611 notifies A (601) that it has no greeting corresponding to that ID, A (601) sends the group server 611 the files corresponding to that greeting. These greeting files are then transmitted to every member of the group except for A (601). These files can then simply be displayed by the group members, or they can also be cached on each group member's computer, so that the group server need only send the ID the next time A (601) wishes to send that same greeting. In an alternative embodiment of the invention, files may be sent to and received from the server while notifications are executed via peer-to-peer communications.

By sending an individualized greeting to every member of the group, a group member can express his or her individuality and at the same time express and engender a sense of community. As in more traditional social settings, the greeting, group icon, and presence and activity notification options reflect a balance between individualism and group activities and interactions. Depending on which alternative is chosen, the group member can send different signals to the group in a complex, non-verbal communication.

Figure 7:
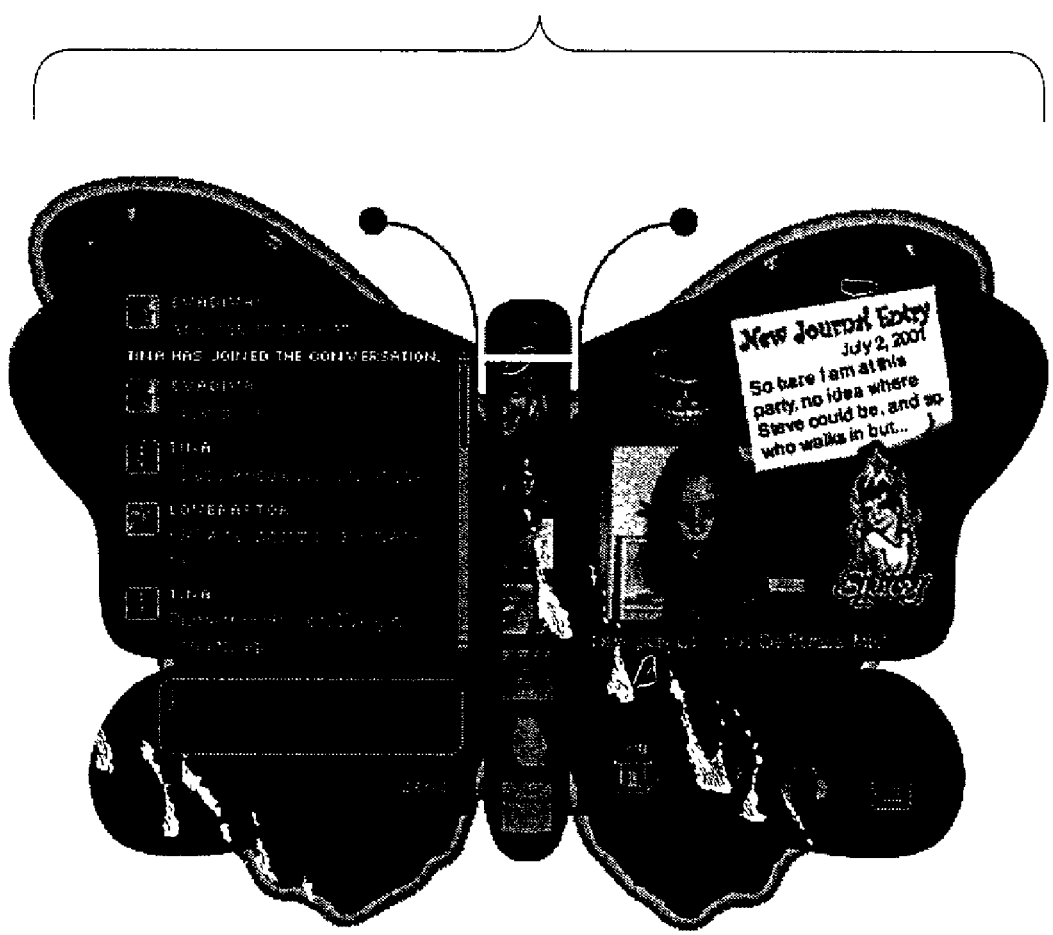
FIG. 7 is a screen shot illustrating a group chat session initiated via a group icon in accordance with an embodiment of the present invention.

These novel means of communication are also complemented with more robust, traditional methods of communication, like chatting forums. As shown in FIG. 7, the members of a group can chat with each other in a familiar text-based way through their implementations of the invention. If a particular group member wants to chat with the group, that group member can open a group space 701 through the group icon's menu options opened by the Launch option 411 in the menu 401 in FIG. 4. Once a group space 701 is opened, an invitation will be sent to each online group member, and the group space is opened and a group interaction will be enabled. In one embodiment, each online group member can accept or decline this request to join the group in the group space 701, but the chat initiator is unable, in an embodiment, to choose between group members when sending the simultaneous invitation. As with the other activities described herein, the group chat is necessarily group, not individual, oriented, and therefore contributes to the sense of a community and shared experiences.

In one implementation, interactions in the group space 701 are implemented using peer-to-peer technologies. In this framework, for example, one group member sends a text message along with a group member identifier to those group members with which that group member is logically connected, and those group members automatically forward the message to those other group members with which they are logically connected, and so on until the message has been replicated through the entire group. The text message is then automatically displayed on each group member's computer in a group window 701. In other implementations, the text messages may be sent directly to a central server, from which each group member receives updates whenever a new text message is sent. In a further embodiment of the invention, server communications and peer-to-peer communications may be used together in a hybrid fashion as described above.

Figure 8:
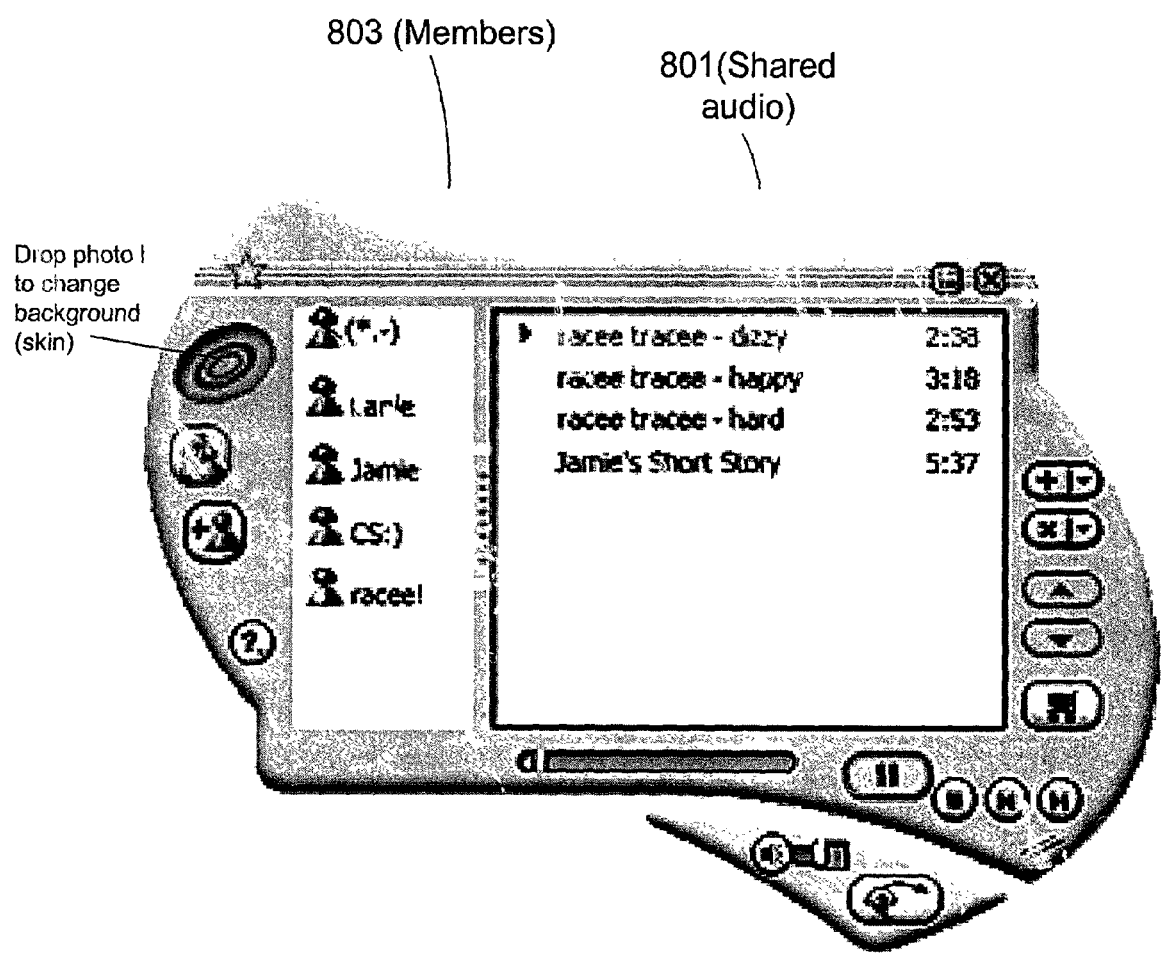
FIG. 8 is a screen shot illustrating a simultaneous group audio sharing activity initiated via a group icon in accordance with an embodiment of the present invention.

Another example of a group activity that is facilitated by this invention is a group audio play activity, in which group members listen to audio being played in a substantially synchronous manner on each group member's computer. As shown in FIG. 8, this group audio play activity 801 can be carried out concurrently with the group space function 803 described above or with other activities. In order to start the group audio play activity 801, one of the group members chooses the group audio play activity 801 from the icon's menu, as for example through the Launch option 411 on the menu 401 shown in FIG. 4. Once the group audio play activity has been chosen, that group member's computer displays the module 801 that coordinates this activity, and the other members of the group receive an invitation to participate in this activity. If a group member chooses to participate, the group audio play program is also displayed on his or her computer. The group audio play activity 801 allows every participating member of the group to listen to the same audio work and interact with the same audio work play list at substantially the same time. Every member of the group has the ability to change the order of the audio works in the play list, to add audio work to the play list, to delete audio work from the play list, and to control the operation of the group audio player 801. As with offline interactions, the group is thereby able to listen to audio works together while at the same time engaging in various conversations and other activities.

Figure 4:
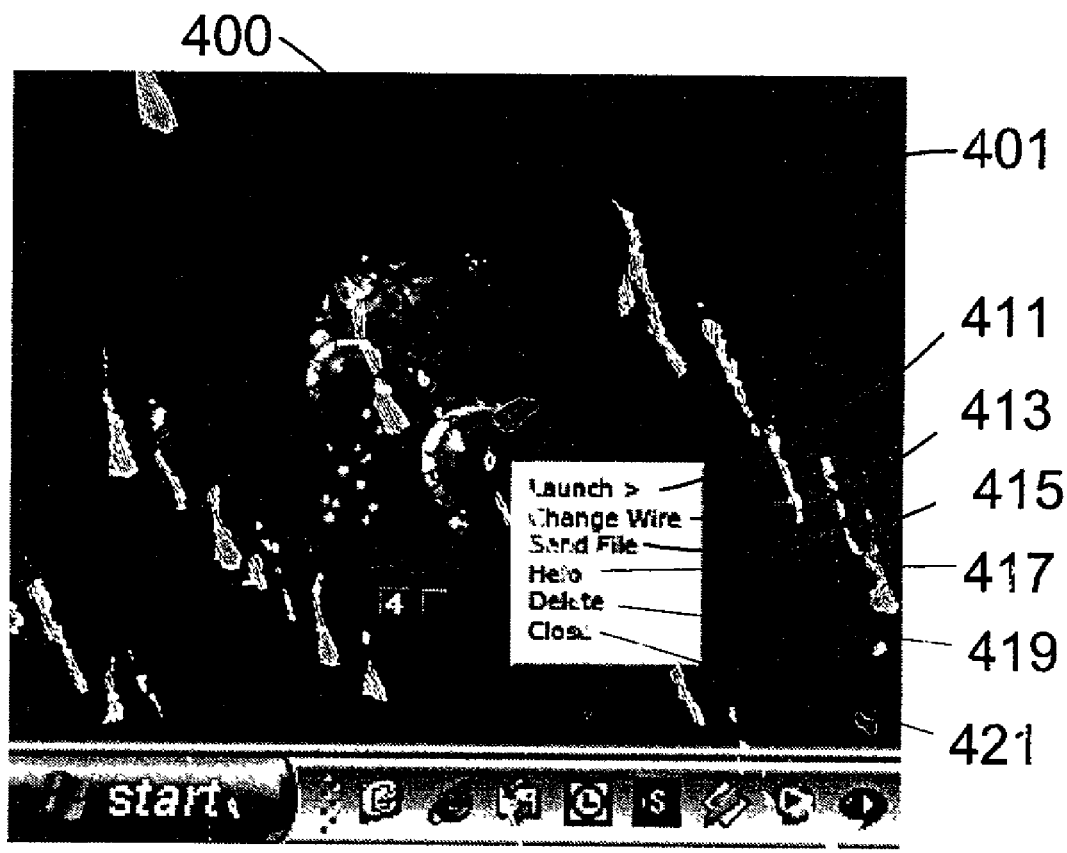
FIG. 4 is a screen shot illustrating a result of a right mouse click on a group icon within a user interface according to an embodiment of the invention.

The icon, 400 of FIG. 4, can also be used as a launching point for sharing files with the group. So, for example, any group member can send a picture, text, or other data file to every interested member of the group with one action. Each member of the group has the ability to ignore or accept the file transfer request, but in many situations may initially ignore a file transfer request and later accept it if he or she changes his or her mind. The only files available to the group for downloading are those files chosen by a particular group member to send to the other members of the group. While many of the same files may become duplicated on each member's computer, no group member has unlimited access generally to files on another group member's computer. Note that group history is maintained such that users can retrieve and manage files being sent during their online session. The group history feature embodies two non-synchronous activities, namely browsing group history and managing files. Users can also preferably see what greetings were missed while they were offline as well as what new members have joined the group. When a user subsequently logs out, their group history may be cleared.

Figure 9:
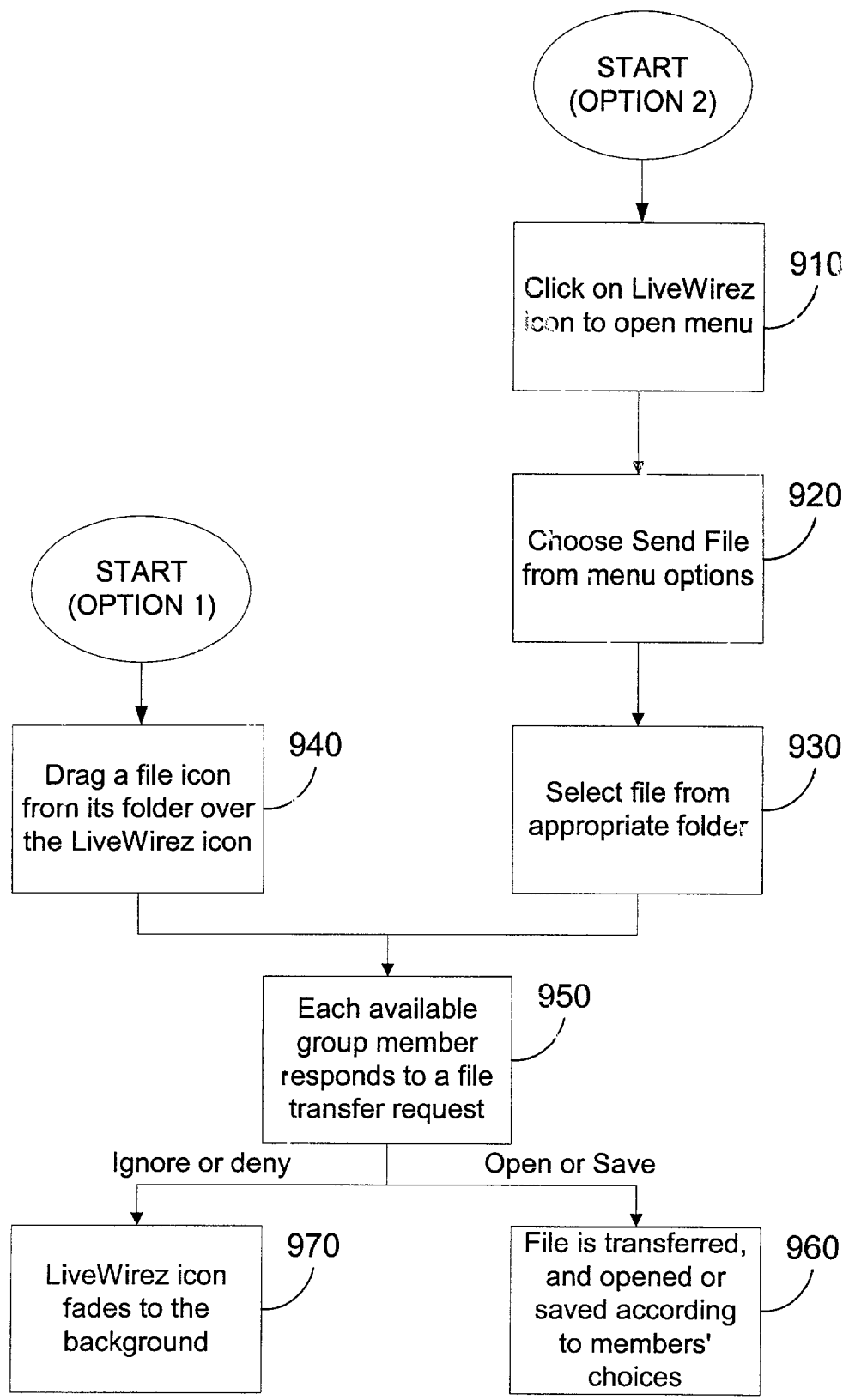
FIG. 9 is a flowchart illustrating a file share activity according to an embodiment of the present invention.

In order to share a particular file with the rest of the group, a group member has the choice of two methods shown in the flowchart on FIG. 9. The simpler of the two methods, as shown at step 940, takes advantage of the desktop object characteristics inherent in this application. Using the existing functionality of many desktop operating systems, an icon representing the shared file can be dragged over the application icon (element 400 of FIG. 4) and dropped. Once the mouse button has been released, the file transfer process will begin. The more cumbersome of these methods allows the group member to open the application's menu, menu 401 in FIG. 4, in step 910, such as by a right click as described above, choose the Send File menu option (as shown in FIG. 4, element 415), step 920, and then select the file, step 930. The application's menu 401 can be opened using mouse clicks or keyboard shortcuts. Once the Send File menu option 415 is chosen, the application will once again exploit underlying operating system functionality to browse through the files stored on the user's computer to find the file that the group member wishes to share. In one implementation, once this file has been selected for sharing, the sharing group member also has the opportunity to send a text message describing the file to the rest of the group members.

Once sent, the file transfer request is responded to by the online group members, as shown in step 950. The online group members are given the choice of receiving the file or ignoring the file transfer request. If a group member denies the request, the request notification disappears and the application icon fades to the background, as shown in step 970. If, on the other hand, a group member accepts the request, the file is transferred and opened or saved according to the group member's choice, as shown at step 960. The method of file transfer is similar to that described above with respect to transfer of greeting files in an embodiment. Group history allows a user to ignore the notification after which the notification will itself fade or disappear. However, the user can later accept the file transfer from the group history during the same online session.

As an example of the file transfer process, assume in one peer-to-peer implementation, on a network similar to that shown in FIG. 1B, computer C sends a file transfer request to every online group member. In this example, assume that only E responds positively to the request. E, not knowing on what computer the file is stored, sends an affirmative response to the two computers, D and F, with which it has a logical connection. D, which is not sharing this particular file, forwards this affirmative response to computers B and G. B, which is not sharing this particular file, forwards this affirmative response to C and A. C, which is the sharing computer, receives the response originating at E and proceeds to send the file. There are alternative implementations of the precise path taken by this file. In one implementation, each computer sends the file to the computer that forwarded it the response. Thus, B will receive the file from C, D from B and finally E from D. In another implementation, each computer sends the file to every computer that it is logically connected with. While the former implementation seems less resource-intensive, when not every computer in the peer-to-peer network responds to the file transfer request immediately, it might be helpful to have copies of the file resident on each group member's computer until the request is ignored. In yet another implementation, a logical connection could be formed between E and C, by either of the two computers. This logical connection could then be used to transfer the file and subsequently closed to eliminate duplicative and unnecessary network branches. In a central server implementation, in a network similar to that shown by the dotted line in FIG. 6B, a computer, A (601) in this case, could upload a shared file to the group server 611. The group server 611 would then forward a file transfer request to B (603) through E (609). If any group member responds affirmatively to the file transfer request, the file could be downloaded from the group server 611. After all interested group members have downloaded the file, the group server 611 could either keep the file in the group's database, or delete it to save space.

Most significantly, for each of the above-described activities, the same group participates. As long as a member is online, that member can be a participant in a large number of shared activities, building a sense of intimate, shared connections with the other members of the group. Note that different groups can have different activities available to them. For example, a user may have one group space with an audio activity and a journal activity, and another group space that has only a game activity.

According to an embodiment of the invention, a temporary, perhaps less intimate, grouping may be provided, similar to a party. In particular, invited individuals would receive an invitation to attend an event, i.e. to join a temporary group, preferably at a specified time, so that the attendees can mingle and get to know other attendees better. In a further embodiment, the group space wherein the temporary group meets may display a plurality of threads or conversation spaces, rather than just one, so that users can drift between conversations, and move from one attendee to another, much like a party in the physical world. All attendees are in the same space, but a number of smaller groups may form within that space.

Another aspect of an embodiment of the invention lies in the way in which each member of the group learns of the group's activities. There are a number of different notifications, more or less intrusive, by which members are invited to join in different activities, or can join in activities that are already in progress. By keeping group members constantly apprised of the group's activities, the overall sense of presence is heightened, and members are encouraged to participate with the group. In addition, the intrusive nature of some of the notifications makes the group more interactive and more difficult to ignore. Practically, this will often result in a situation where those members that are available to the rest of the group are more willing to participate in group activities.

Figure 10:
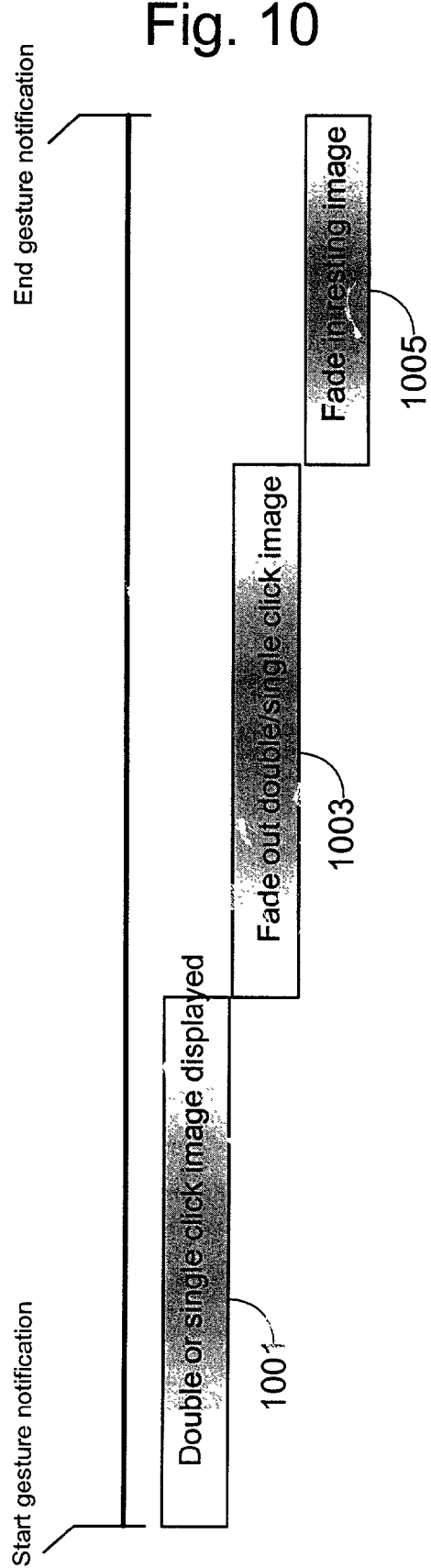
FIG. 10 is a flowchart illustrating the display of a greeting notification according to an embodiment of the invention.

The least intrusive notifications are greetings and other actions that require less interaction. Since these activities are less likely to require a great deal of attention, in most implementations, a greeting will be given only a limited time on a group member's screen, and will not require a great deal of interaction from that group member. In one implementation, shown in the time diagram of FIG. 10 with respect to a greeting, a group member receiving a greeting will first be shown the greeting in the foreground as shown at state 1001, regardless of what other applications he or she is running. This foreground greeting 1001 will then fade out, as shown at state 1003, after a predetermined amount of time, such as five seconds, and a resting image will remain as shown at state 1005. This resting image, a semi-transparent representation of the gesture notification, will also eventually disappear, after 20 seconds for example and be made available in the group's history in case the user missed it or wants to see it again during their online session. In other implementations, the greeting might remain in the foreground until the group member clicks on it, or brings another application to the foreground again. These greetings thereby inform the group members of group activity without demanding significant attention.

Figure 11:
FIG. 11 is a screen shot illustrating a file transfer request notification according to an embodiment of the present invention.

Other activity notifications require more interaction, corresponding to the importance of the activity. So, for example, in one implementation shown in FIG. 11, a file transfer request 1101 may be more intrusive, meaning that an online group member is "forced" to interact with the icon before returning to any other applications. Such forcing need not be completely preclusive of other activities, as with many dialog boxes and so forth sometimes employed in application design. For example, an icon may stay in the foreground longer, or not fade, or fade over a longer period of time, so that the user feels more of a need to interact with the icon. This file transfer request need not be accepted, however, due to network constraints, and a desire to have file transfers completed as promptly as possible, it is desirable that the group member inform the group whether or not he or she will be downloading this file as quickly as possible. Similarly, chatting and group audio play invitations might also be more intrusive, attracting a significant amount of a group member's attention away from his or her other applications. These invitations are intrusive because they are fundamentally more interactive activities, and members would often wish to be kept better informed of these interactions. In one implementation, a group member can control the level of intrusiveness of a particular notification through a settings menu or otherwise, such that certain groups and activities in which that group member is less likely to participate will have less intrusiveness.

Figure 12:
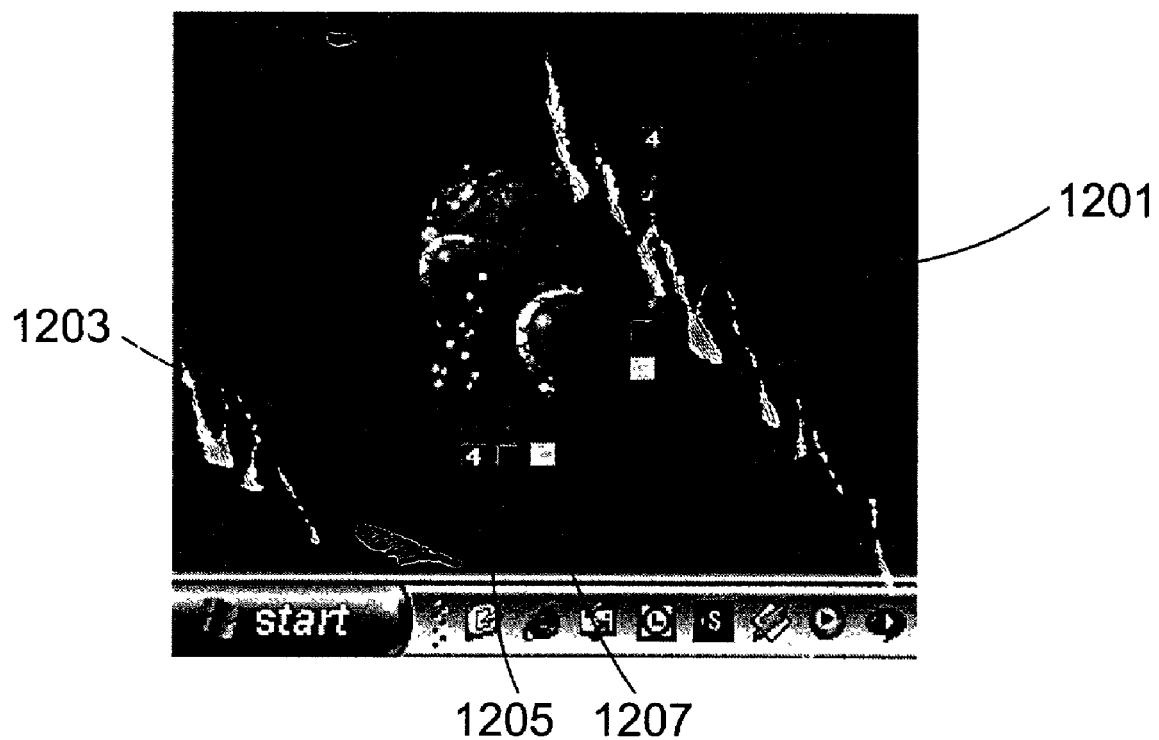
FIG. 12 is a screen shot illustrating the group status notification resident on the desktop, and the rollover functionality of the icon according to an embodiment of the present invention.

Finally, even if a group member was unavailable to participate in an activity, or originally rejected an invitation to participate, that group member can discover what activities the group is participating in using the group status notification bar, element 1203 in FIG. 12, located below the group icon. As shown in FIG. 12, this bar 1203 displays icons representing different activities in which members of the group are engaged. In the present example, members of the CoolDudes group are participating in a group audio play activity (represented by an earphone icon 1205) and sharing files with each other (represented by a folder icon 1207). In one implementation, when the group member's mouse is held over the group icon, a rollover bubble is displayed showing the status of the members of the group as well as the activities that the group is participating in, also shown in FIG. 12 as list 1201.

By interacting with the group icon (by clicking on the icon representing the activity in list 1201 or opening a menu, shown as menu 401 in FIG. 4), the group member can begin participating in these activities, although he or she missed or ignored the initial request to join in the activity. This functionality allows a group member to be kept constantly apprised of the group's activity, and enables that group member to participate in any ongoing activity. The invention uses and forwards, in an embodiment, the presence information from a chatting program to all group members, even if some of those members are not on the user's buddy list. Thus, a user can keep track of people with whom he or she does not have a direct relationship.

It will be appreciated that a novel means of communicating with a group through a network connection represented by an icon on each group member's desktop or other display space has been described. This constant link to a small and relatively static group of friends will enable group members to build a unique sense of community and shared relationship as they participate in various activities with each other.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

We claim:

1. A system for communicably linking a first user of a first computing device having a first display to a group of users of computing devices, the group of users having at least one member comprising a second user of a second computing device having a display, the system comprising in combination:
    a rendered desktop on the display of the first computing device;
    a selectable group icon visibly rendered on the desktop, the group icon being associated with the group of users of computing devices whereby selection of the group icon by the first user initiates transmission of a greeting communication over a network from the first computing device to other computing devices associated with the group of users, wherein the first user is not required to specify the identity of a member of the group of users during or after selection of the group icon, wherein the greeting communication informs the group of users that a member of the group has interacted with the group icon by changing an appearance of the group icon rendered on displays associated with the other computing devices, wherein the appearance is a first manifestation when the selection of the group icon is first type of selection and the appearance is a second manifestation when the selection is a second type of selection, wherein the first type of selection of the group icon is a single click with a pointing device and the second type of selection of the group icon is a double click with a pointing device, wherein the first manifestation is different than the second manifestation, and wherein the first manifestation represents a first emotion of the first user to the group and the second manifestation represents a second emotion of the first user to the group.

2. The system according to claim 1, wherein a group status is gathered and displayed automatically prior to selection of the group icon by the first user.

3. The system according to claim 2, wherein the group status comprises an indication of at least one activity in which one or more members of the group are currently engaged.

4. The system according to claim 2, wherein the group status comprises an indication of whether each of the group of users is currently connected to the network.

5. The system according to claim 3, wherein the transmission is adapted to allow the first user to participate in the at least one activity in which the group is currently engaged.

6. The system according to claim 1, wherein the group icon is a drag and drop target such that dropping of a dragged file icon onto the group icon initiates transfer of a file associated with the file icon to the other computing devices of the group of users.

7. The system according to claim 1, wherein the network comprises multiple peer-to-peer connections and at least one of the multiple peer-to-peer connections omits the first computing device as a direct endpoint.

8. The system according to claim 1, wherein a visual appearance of the selectable group icon is modifiable by a modifying user, being one user from among the first user and the group of users, so that a modification of the appearance of the selectable group icon by the modifying user is propagated to a copy of the selectable group icon located on the display of the computing devices of the others of the group of users and the first user.

9. The system according to claim 1, wherein the communication over the network comprises one or more types of material selected from the group consisting of audio information and visual information.

10. The system according to claim 9, wherein the visual information comprises animated material.

11. The system according to claim 9, wherein the visual information comprises video material.

12. The system according to claim 1, wherein the communication over the network comprises a textual message.

13. The system according to claim 1, wherein transmission of the communication over the network from the first computing device to the group of users causes a visual indication to appear on the display of the second computing device in an opaque state and to transform after a predetermined period of time to a transparent state.

14. The system according to claim 1, wherein transmission of the communication over the network from the first computing device to the group of users causes a visual indication to appear on the display of the second computing device in a dominant state, whereby the second user must interact with the visual indication prior to performing any other action on the display of the second computing device.

15. A method of communicating from a first user of a first computing device, having a display associated therewith, to a group of computing device users, each being a user of a computing device having a respective display associated therewith, the group of computing device users comprising at least a second user, the method comprising:
    presenting a visual group icon to the first user on the display of the first computing device, the group icon being associated with the group of computing device users;
    receiving an activation of the group icon by the first user;
    in response to receiving an activation of the group icon by the first user, sending a communication over a network connection from the first computing device to the computing devices associated with the group of computing device users, wherein the communication informs the group of users that a member of the group has interacted with the group icon by changing an appearance of the group icon rendered on displays associated with the computing devices, wherein the appearance is a first manifestation representing a first emotion when the selection of the group icon is first type of selection and the appearance is a second manifestation representing a second emotion when the selection is a second type of selection, wherein the first type of selection of the group icon is a single click with a pointing device and the second type of selection of the group icon is a double click with a pointing device, and wherein the first manifestation is different than the second manifestation.

16. The method according to claim 15, wherein presenting a visual group icon to the first user on the display of the first computing device further comprises presenting a group status.

17. The method according to claim 16, wherein the group status discloses an activity in which one or more members of the group of computing device users is currently engaged.

18. The method according to claim 16, wherein the group status discloses whether each of the group of users is currently connected to the network.

19. The method according to claim 15, wherein sending a communication over the network connection comprises sending an indication to the computing devices associated with the group of computing device users that the first user wishes to participate in an activity in which one or more members of the group of computing devices are currently engaged.

20. The method according to claim 15, wherein receiving an activation of the group icon by the first user comprises receiving an indication that the user has dropped a file icon onto the group icon, and wherein sending a communication over the network connection from the first computing device to the computing devices associated with the group of computing device users comprises sending an indication that a file associated with the file icon is available to be transferred to the computing devices associated with the group of computing device users.

21. The method according to claim 15, wherein the network is of a type selected from the group consisting of a peer-to-peer network and a network having a central server.

22. The method according to claim 15, wherein a visual appearance of the group icon is modifiable by the first user so that a modification of the appearance of the group icon by the first user is propagated to a copy of the group icon located on the display of the computing device associated with second user.

23. The method according to claim 15, wherein sending the communication over a network comprises sending over the network information having one or more types selected from the group consisting of audio information, video information, animated information, and textual information.

24. The method according to claim 23, wherein sending the communication over a network further comprises sending over the network information sufficient to cause a visual indication to appear on the display of the second computing device in an opaque state and to transform after a predetermined period of time to a transparent state.

* * * * *